Aug. 19, 1958 D. H. RING 2,848,714

ANTENNA COUPLING CIRCUITS

Filed June 8, 1955 2 Sheets-Sheet 1

INVENTOR
D. H. RING

BY H. O. Wright
ATTORNEY

Aug. 19, 1958 D. H. RING 2,848,714
ANTENNA COUPLING CIRCUITS
Filed June 8, 1955 2 Sheets-Sheet 2
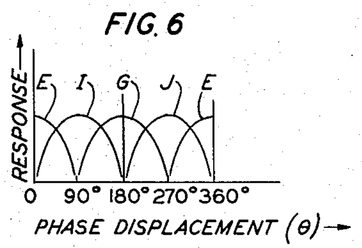
FIG. 6
FIG. 7
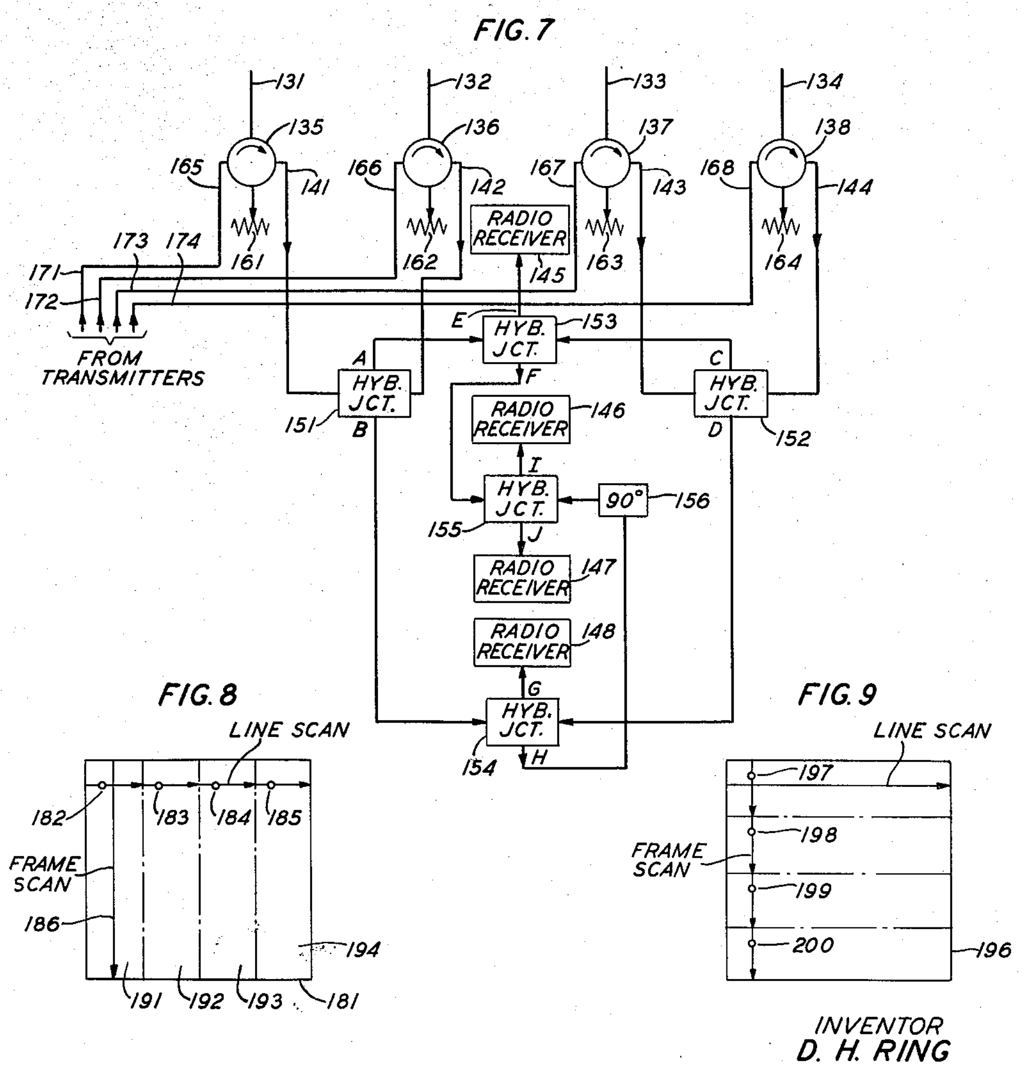
FIG. 8, FIG. 9
INVENTOR
D. H. RING
BY H. O. Wright
ATTORNEY United States Patent Office 2,848,714

Patented Aug. 19, 1958

2,848,714

ANTENNA COUPLING CIRCUITS

Douglas H. Ring, Red Bank, N. J., assignor to Bell Telephone Laboratories, Incorporated, New York, N. Y., a corporation of New York Application June 8, 1955, Serial No. 513,957

12 Claims. (Cl. 343—100)

This invention relates to antenna coupling circuits. More specifically, the present circuits couple a single antenna array to two or more radio receivers or transmitters or both, so that they receive or transmit energy in different directions.

At a radio receiving station it is often desirable to receive signals from one direction and, at the same time, search for incoming signals from other directions. In diversity receiving systems, for example, it has been proposed to employ two separate receiving antenna arrays for this purpose. Although the extra antenna array is expensive, the advantage of receiving signals from various directions at a receiving station is often considered sufficient to justify the expense.

Another closely related aspect of the invention involves the scanning of a distant landscape. In such scanning, the received signal energy is inversely proportional to the speed of scan. If two separate portions of the field to be scanned are simultaneously scanned, the scanning speed can be reduced and the amount of received signal energy increased. As in the case of diversity systems, it has been proposed heretofore to use two complete systems including separate antennas to accomplish this purpose.

The principal object of the present invention is to couple two or more units of radio signal apparatus to a single antenna array so that each radio apparatus can receive or transmit signal energy in a different direction, independently of the other radio apparatus.

A relatively new wave guide component termed a "circulator" is an important component element of many of the present circuits. A circulator is a nonreciprocal electrical component having at least three terminals. It has the property that energy applied to a first terminal is coupled to a second terminal of the circulator; and energy applied to a second terminal is coupled to a third terminal of the circulator. This is, of course, contrary to the expected operation of a reciprocal electrical component in which energy applied to the second terminal is coupled back to the first terminal. As suggested by the name "circulator," energy applied to the third terminal of the unit is connected in turn to the next successive terminal of the circulator, and finally, energy applied to the last terminal of the circulator is coupled to the first terminal. References to several specific operative circulators appear in the body of this specification.

In accordance with one aspect of the present invention, each antenna element is coupled to each radio apparatus by a circulator. Each circulator has several terminals, the first of which is coupled to an antenna element, the second of which is connected to a first radio apparatus, and the third and following terminals being connected to other radio apparatus. When energy is being received, for example, by the first radio apparatus, the circulator operates to connect the antenna elements to this first radio apparatus. The circuits connecting the circulator to the first radio apparatus determine the direction of reception, and energy from other directions is reflected back to the circulator. The nonreciprocal properties of the circulator couple the reflected energy to the next radio receiver. In this manner, successive receivers are connected to the single antenna array to receive energy from different directions.

In accordance with another aspect of the invention, elements of a highly directive antenna are coupled by hybrid junctions to different radio apparatus in such a manner that each of the individual radio apparatus receives or transmits signals at respectively different directions with respect to the antenna.

Other objects, and various advantages and features of the invention will become apparent by reference to the following description taken in connection with the accompanying drawings forming a part thereof, and from the appended claims.

In the drawings:

Fig. 6 illustrates the response characteristic versus phase displacement angle of the antenna array of Fig. 5;

Fig. 7 is an alternative coupling circuit which employs hybrid junctions; and

Figs. 8 and 9 illustrate the use of the present invention in two similar scanning arrangements.

Figure 1:
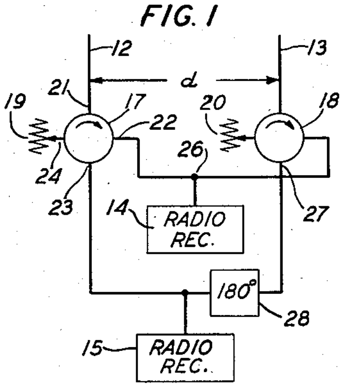
Fig. 1 shows a circuit in accordance with the invention for coupling elements of a single antenna array to two separate radio receivers.

Referring more particularly to the drawings, Fig. 1 shows, by way of example and for purposes of illustration, an antenna coupling circuit in which a single antenna array 12, 13 is coupled to two different radio receivers 14, 15. In Fig. 1, two circulators 17, 18 are connected respectively to the antenna elements 12, 13. These circulators are nonreciprocal in their electrical properties. Thus, for example, energy received from antenna element 12 at terminal 21 of the circulator 17 is coupled to terminal 22 of the circulator; when energy is applied to terminal 22 of the circulator, it does not appear at terminal 21 as predicted by the theorem of reciprocity, but is coupled to terminal 23. Similarly, when energy is applied to terminal 23, it is circulated to terminal 24; and energy which might be applied at terminal 24 would reappear at terminal 21 of the circulator.

Radio frequency energy from the antenna elements 12 and 13 passes through the circulator elements 17 and 18 to the junction point 26. At the junction point 26, the energy from antenna elements 12 and 13 which is in phase, is coupled to the radio receiver 14. Radio energy which is not in phase, however, will be reflected back to the circulators 17 and 18. This energy will reappear at terminal 23 of circulator 17, and at terminal 27 of circulator 18. The energy from terminals 23 and 27 is in phase after having passed through the phase shifting circuit 28, and is applied to the radio receiver 15. The resistances 19 and 20 provide reflectionless terminations for the fourth terminals of the circulators 17 and 18, respectively.

Figure 2:
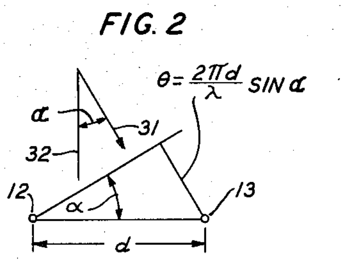
Figs. 2 and 3 show the response characteristics versus phase displacement angle of the antenna array of Fig. 1.

In Fig. 2, the antenna elements 12 and 13 are shown from above, and input electromagnetic waves are indicated as arriving from the direction indicated by the arrow 31. The angle of incidence of the electromagnetic waves is measured with respect to the reference direction 32, which is perpendicular to a line drawn between the two antenna elements 12 and 13. With the electromagnetic waves incident along direction 31, they arrive at antenna element 12 before they reach element 13. The delay in the arrival of the waves at the second element is termed the phase displacement and is designated $\theta$ in Fig. 2 Mathematically, the phase displacement $\theta$ is given by the following expression:

$$\theta=\frac{2\pi d}{\lambda}\sin\alpha \qquad (1)$$

where $d$ is the separation of the antenna elements, $\lambda$ is the wavelength of the incident electromagnetic waves, and $\alpha$ is the angle of incidence of the electromagnetic waves as shown in Fig. 2.

Figure 3:
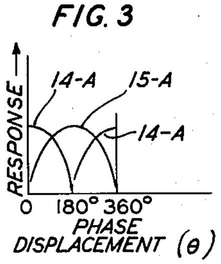

Fig. 3 shows plots of the response of the two element antenna array of Fig. 1 versus phase displacement at each of the radio receivers 14 and 15 of Fig. 1. The plot for the receiver 14 is designated 14–A in Fig. 3, and the response plot for receiver 15 is designated 15–A in Fig. 3. Thus, for example, waves arriving perependicular or broadside to the array 12, 13 (where the phase displacement is zero) induce maximum signal in receiver 14, and no signal in receiver 15. This is expected from the fact that the antenna elements are connected in phase to radio receiver 14, and are connected out of phase (in view of the 180 degree phase shifter 28) to receiver 15.

The circulators 17 and 18 represent an important feature of the antenna coupling circuit of Fig. 1. The circulators may be of any one of a number of known forms. By way of example, two forms of circulator which use the Faraday effect in nonconducting ferrites to obtain the required nonreciprocity are shown in Figs. 12 through 14 of an article by C. L. Hogan entitled "The Ferromagnetic Faraday Effect at Microwave Frequencies" which appeared at pages 253 through 263 of Reviews of Modern Physics, January 1953, volume 25, No. 1. A circulator of the Faraday effect type is also mentioned by N. G. Sakiotis and H. N. Chait at page 93 of their article entitled "Ferrites at Microwaves," which appeared at pages 87 through 93 of the January 1953 issue of the Proceedings of the I. R. E. Circulators have also been constructed which use directional couplers and ferrite material in parallel rectangular guides. Two such structures are shown in M. T. Weiss, application Serial No. 374,511, which was filed on August 17, 1953, and in S. E. Miller, application Serial No. 371,437 filed July 31, 1953.

Figure 4:
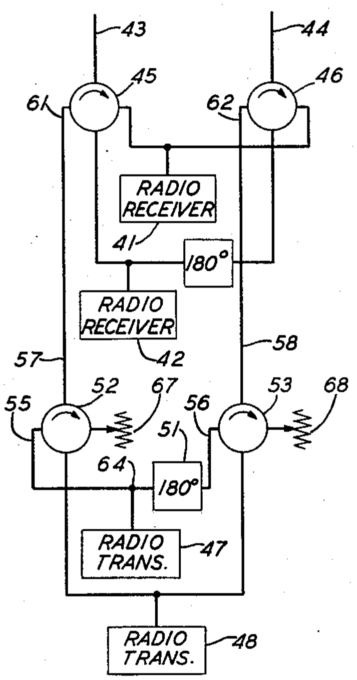
Fig. 4 shows an antenna coupling circuit for coupling a plurality of radio receivers and a plurality of radio transmitters to a single antenna array.

Fig. 4 illustrates an antenna coupling circuit arrangement representing the maximum development of a two element antenna array. Specifically, the circuits of Fig. 4 include two radio receivers 41 and 42 which are coupled to the antenna elements 43, 44 by the circulators 45, 46 to receive electromagnetic wave energy from different directions in much the same manner as in the circuit of Fig. 1. In addition, however, the circuit of Fig. 4 includes two radio transmitters 47 and 48 which are also coupled to the same pair of antenna elements 43, 44 to transmit electromagnetic energy in different directions.

The coupling circuit for the transmitters 47 and 48 includes the 180 degree phase shifting circuit 51 and the circulators 52 and 53, in addition to the circulators 45 and 46. Energy from the transmitter 47 is applied to terminals 55 and 56 of the two circulators 52 and 53, respectively. This energy is coupled to terminals 57 and 58 of the circulators 52 and 53 and is then transmitted to terminals 61 and 62 of the circulators 45 and 46, respectively. The output energy is circulated to the antenna elements 43 and 44. Because the energy from transmitter 47 which is coupled to antenna element 44 passes through the phase shifter 51, it is 180 degrees out of phase with the energy at antenna element 43. Therefore, the directional characteristic is that indicated at 15–A in Fig. 3.

Energy from the transmitter 48, however, is reflected at junction point 64 and eventually appears at antenna elements 43, 44 in phase. Accordingly, the directional characteristic of transmitter 48 is that indicated at 14–A in Fig. 3. Energy transmitted toward circulators 52 and 53 on leads 57 and 58 is dissipated in the resistive terminations 67 and 68.

In Figs. 1 and 4, several junction points such as 26 and 64 have been mentioned. These may in practice be realized by many types of junctions. For example, the circuit to the radio apparatus may be a coaxial line having a given characteristic impedance, and the two circuits leading to the antenna elements may be coaxial lines having twice the characteristic impedance of the circuit to the radio apparatus. Two wire lines having similar impedance ratios may be employed. Another connecting circuit which may be used is a suitable hybrid junction such as that disclosed at pages 340 and 341 of a text entitled "Waveguide Transmission" by G. C. Southworth, D. Van Nostrand Co., Inc., 1950. For the purposes of the present description, however, it is assumed that the junctions are matching transformer structures, such as the coaxial line arrangement mentioned above.

For the purposes of the present description, it will also be assumed that there is zero phase shift in the circuits interconnecting the antenna elements, the circulators and the units of radio apparatus. In actual practice, the circuits are made to have the same length for zero differential phase shift, and have different lengths when some relative phase shift is desired.

Figure 5:
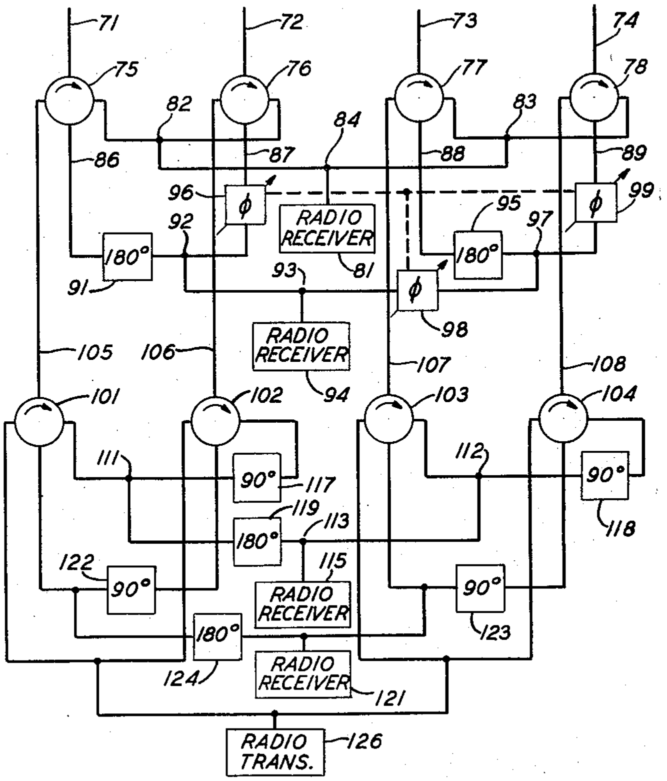
Fig. 5 illustrates an antenna coupling circuit for a four element antenna array.

Fig. 5 illustrates the application of coupling circuits employing circulators to a four element antenna array. The four elements 71, 72, 73 and 74 of the array are connected respectively to the circulators 75, 76, 77 and 78. Electromagnetic wave energy received broadside to the array is coupled in phase to the radio receiver 81 by a simple converging network. The electromagnetic wave energy which is not in phase at junction points 82, 83, 84 is reflected back to the circulators 75 through 78 and is circulated to output leads 86 through 89, respectively, of these circulators.

Energy received at terminal 86 passes through the 180 degree phase shifting circuit 91, the junction points 92 and 93, to the radio receiver 94. Similarly, energy applied to the lead 87 is coupled to the radio receiver 94 by the variable phase shifting circuit 96 and the junction points 92 and 93; the lead 88 is connected to the receiver 94 by the fixed 180 degree phase shifter 95, the junction 97, the variable phase shifter 98, and by junction 93. A variable phase shifter 99, which is mechanically coupled to the phase shifting circuits 96 and 98, is connected between lead 89 and junction point 97.

Fig. 6 shows the response characteristics of the radio apparatus of the circuit of Fig. 5, as well as that of Fig. 7. In particular, the characteristic E in Fig. 6 corresponds to the response of the first level radio receiver 81 of Fig. 5, which receives energy from all of the antenna elements with no relative phase shift. From Fig. 6, it may be observed that the characteristic E is a maximum at zero phase displacement when the input radio signals arrive perpendicular to the antenna array. When the input radio signals are displaced at an angle such that the phase displacement between antenna elements is 90 degrees, the received signal at radio receiver 81 drops off to zero.

The second level radio receiver 94 of Fig. 5 has three variable phase shifting elements 96, 98 and 99 in its input circuit. When these three phase shifters are all set to zero, the response characteristic of the receiver 94 corresponds to the plot G in Fig. 6. When the variable phase shifting elements 96, 98 and 99 are adjusted simultaneously, however, the reception characteristic of the radio receiver is shifted in direction. Thus, for example, if signal information is being received from a given direction on radio receiver 81, it may be desired to sweep the incoming directions for other signals. This is accomplished by synchronously varying the phase shifting elements 96, 98 and 99. The characteristic G in Fig. 6 could then be shifted to the positions indicated at I and J, for example. Thus, a diversity receiving station is obtained in which only one antenna is employed.

Energy which is not abstracted by radio receivers 81 and 94 of Fig. 5 is reflected back to the circulators 75 through 78. This energy is then coupled to circulators 101 through 104 by circuits 105 through 108, respectively. Signals from the circulators 101 through 104 are connected through junction points 111, 112 and 113 to the radio receiver 115. The two 90 degree phase shifting circuits 117 and 118 are connected in the circuits from circulators 102 and 104, respectively, and the 180 degree phase shifting network 119 is connected between the junction points 111 and 113. Under these circumstances, the radio receiver 115 has a characteristic corresponding to that shown at I in Fig. 6.

Radio receiver 121 is similarly connected to the next following set of output terminals from the circulators 101 through 104. Its input converging circuit includes the two 90 degree phase shifting circuits 122 and 123 and the 180 degree phase shifting network 124. The radio receiver 121 has a directional characteristic as indicated at J in Fig. 6. Thus, when the variable phase shifting networks 96, 98 and 99 are set to zero, the directional characteristics of the receivers 81, 94, 115 and 121 are those indicated in Fig. 6 at E, G, I and J, respectively.

The antenna array 71 through 74 is also used for transmitting signals from the radio transmitter 126. The radio transmitter 126 is coupled to the remaining terminals of each of the circulators 101 through 104. Energy from the transmitter 126 is then transmitted from circulators 101 through 104 to circulators 75 through 78 by circuits 105 through 108, respectively. The energy applied to the circulators 75 through 78 is coupled to the antenna elements 71 through 74. Because there are no phase shifting circuits incorporated in the transmission coupling network, all of the antenna elements are energized in phase. The resulting transmitted beam is radiated broadside, or perpendicular, to the antenna array 171 through 174. The directional characteristic accordingly conforms to that indicated at E in Fig. 6.

It is to be understood, of course, that when the circuit of Fig. 5 is employed as a diversity receiving set, only radio receivers 81 and 94 are employed, and that receivers 115 and 121 are disabled. Under these conditions, radio receiver 81 receives energy arriving perpendicular, or broadside, to the antenna array; and receiver 94 scans other directions as the variable phase shifters 96, 98 and 99 are adjusted.

Fig. 7 illustrates a circuit in which circulators and hybrid junctions are employed in an antenna coupling circuit for both transmitters and receivers. More specifically, the circuit of Fig. 7 includes the four antenna elements 131, 132, 133 and 134 connected respectively to the circulators 135, 136, 137 and 138. The circulators 135 through 138 have a first set of leads 141 through 144, which are connected to a group of radio receivers 145 through 148. The derivation of the directional characteristics of the radio receivers 145 through 148 will now be covered in a cursory manner. Initially, the phase displacement $\theta$ is determined as indicated in the diagram of Fig. 2, and as set forth in equation (1) hereinabove. In Fig. 7, the antenna elements 131 and 132 are coupled to two of the terminals of hybrid junction 151. The output from element 131 of the antenna array at point 141 is used as a phase reference in the following analysis. Then the output voltages from terminals A and B of hybrid junction 151 are as follows:

$$A=\sqrt{1+\cos\theta}\,\underline{|\theta/2} \qquad (2)$$

$$B=\sqrt{1-\cos\theta}\,\underline{\left|\frac{\theta-\pi}{2}\right.} \qquad (3)$$

where the angle following the symbol "|__" indicates the angle of the vector relative to the phase reference.

The energy received at antenna elements 133 and 134 is combined in hybrid junction 152. One set of corresponding output terminals A and C of hybrid junctions 151 and 152, respectively, are coupled to hybrid junction 153, and the other set of corresponding output terminals B and D are coupled to hybrid junction 154. Output terminal E of hybrid 153 is connected to the radio receiver 145; and output terminal G of hybrid 154 is connected to radio receiver 148. Output terminal F of hybrid 153 is connected directly to another hybrid junction 155, and output terminal H of hybrid 154 is connected to hybrid junction 155 through a 90 degree phase shift unit 156. The output terminals I and J of hybrid junction 155 are connected to radio receivers designated 146 and 147, respectively.

Straightforward mathematical analysis reveals that the outputs at the four radio receivers are as follows:

$$E=2\cos\theta\cos\frac{\theta}{2} \qquad (4)$$

$$G=2\cos\theta\sin\frac{\theta}{2} \qquad (5)$$

$$I=\sqrt{2}\sin\theta\left(\cos\frac{\theta}{2}+\sin\frac{\theta}{2}\right) \qquad (6)$$

$$J=\sqrt{2}\sin\theta\left(\cos\frac{\theta}{2}-\sin\frac{\theta}{2}\right) \qquad (7)$$

The formula for E, which is the output at radio receiver 145, is the formula for the directional pattern of a four element array with its maximum at $\theta=0$. The outputs at the other radio receivers take the form of E when the following substitutions are introduced:

$$\theta=(\theta_G+\pi) \qquad (8)$$

$$\theta=\left(\theta_I+\frac{\pi}{2}\right) \qquad (9)$$

$$\theta=\left(\theta_J+\frac{3\pi}{2}\right) \qquad (10)$$

Thus, as shown in Fig. 6, the pattern seen at G (radio receiver 148) has a maximum at $\theta=\pi=180°$; the pattern at I (radio receiver 146) has a maximum at $$\theta=\frac{\pi}{2}=90°$$

the pattern at J (radio receiver 147) has a maximum at $$\theta=\frac{3\pi}{2}=270°$$

and outputs with a maximum at each of the nulls of the usual array factor are obtained. These outputs are all matched and independent of each other, and represent the maximum number of outputs obtainable since a one hundred percent output at any one terminal is impossible, except at the nulls of all other outputs. The outputs at the receivers 145 and 148 are wide band, since their input circuits include no phase shift circuits in addition to the hybrid junctions. The outputs at receivers 146 and 147 are narrower band, to the extent that the phase shifting circuit 156 limits the band. Any such limiting with respect to radio receivers 146 and 147 does not react back on receivers 145 and 148, however.

From the directional characteristic of Fig. 6, it is clear that the greater portion of the energy received by antenna elements 131 through 134 and applied to leads 141 through 144 is absorbed by the radio receivers. However, any energy which is reflected back to the circulators 135 through 138 is circulated to and dissipated in the resistances 161 through 164. The circulators 135 through 138 have another set of terminals 165 through 168, respectively. Energy supplied to these terminals is coupled directly to the antenna elements 131 through 134, and radiated therefrom. It is therefore contemplated that a second antenna coupling circuit identical to that described hereinabove for the radio receivers 145 through 148 be coupled to the circuits 171 through 174, which are in turn connected to the circulator terminals 165 through 168. With transmitters connected to this antenna coupling circuit, an output radiation pattern having the form shown in Fig. 6 is obtained. Thus, the circuit of Fig. 7 permits independent reception and transmission of energy from four different directions.

The use of the present antenna coupling arrangements to improve the sensitivity of scanning of a distant landscape is shown graphically in Figs. 8 and 9. In Fig. 8, the region to be scanned is indicated by the rectangle 181. A highly directional antenna is employed, which may be arranged as indicated in Fig. 5 to have four separate receivers, each receiving energy from a slightly different direction. The four separate pinpoint receiving lobes 182 through 185 of the four receivers are shown in Fig. 8 superposed on the region 181 which is to be scanned. The antenna array is then rotated horizontally and the pinpoint lobes traverse the linear distance indicated by the "line scan" arrows passing through each of the points 182 through 185. The antenna array is then tilted slightly so that the receiving lobes 182 through 185 are shifted slightly relative to the region 181 in the direction indicated by the "frame scan" arrow 186. The antenna is again rotated so the lobes 182 through 185 move in the horizontal direction. This process is repeated until the entire field 181 is scanned, with the individual lobes 182 through 185 scanning the separate areas 191 through 194, respectively.

In the arrangement indicated in Fig. 8, the time for scanning the area 194 may be reduced by a factor of four, as compared to the scanning of the same area with a single pinpoint receiving lobe. Alternatively, the same time may be employed for scanning the area, and correspondingly greater resolution in received signal variations may be obtained.

Fig. 9 represents a variation of Fig. 8. In Fig. 9, the field 196 is scanned by four receivers having their respective receiving lobes 197 through 200 in vertical alignment. In addition to the scanning method mentioned above which involves physically rotating and tilting the antenna structure, scanning may be accomplished in at least one direction by varying the phase shifts from antenna elements to receiver at each level of the coupling circuit. This corresponds to the synchronized variation of the phase shift circuits 96, 98 and 99 of Fig. 5, for example.

It is to be understood that the above-described circuits are illustrative of the application of the principles of the invention. Numerous other coupling circuits, applicable to arrays having three or five or more elements, for example, may be devised by those skilled in the art without departing from the spirit and scope of the invention.

What is claimed is:

1. In combination, a plurality of antenna elements, a like plurality of circulators each having a first terminal connected to one of said antenna elements, first and second radio apparatus, a first converging network coupling said first radio apparatus to the second set of terminals of said circulators, and a second converging network substantially independent of said first converging network coupling said second radio apparatus to a third set of terminals of said circulators.

2. In combination, a plurality of electromagnetic wave radiating elements, a like plurality of circulators each having at least three successively coupled terminals, the first terminal of each of said circulators being coupled to each radiating element, a first radio apparatus coupled to the second terminal of each of said circulators, and a second radio apparatus being coupled to the third terminal of each of said circulators.

3. In an antenna coupling system, at least four antenna elements forming an antenna array, at least two hybrid junctions, means for coupling said elements to input terminals of said hybrid junctions, a first radio apparatus coupled to one set of corresponding output terminals of said hybrid junctions, and a second radio apparatus coupled to another set of output terminals of said hybrid junctions.

4. In a diversity receiving system, an antenna array comprising a plurality of antenna elements, a circulator coupled to each said element, a first radio receiver coupled to a first set of corresponding terminals of each of said circulators, a second radio receiver coupled to a second set of corresponding terminals of said circulators, and synchronized phase shifting means in all but one of the circuits interconnecting said second receiver and said circulators.

5. In combination, a plurality of antenna elements, a like plurality of circulators each coupled to one of said antenna elements and having a plurality of output terminals, a first radio apparatus, a first converging network for coupling said first radio apparatus to a first set of corresponding terminals of each of said circulators, a second radio apparatus, and a second converging network for coupling said second radio apparatus to a second set of corresponding terminals of said circulators, each of said converging networks including impedance matching means at the junction of the outputs from the circulators.

6. In combination, at least four elements forming an antenna array, a plurality of units of radio apparatus, means for coupling each of said units of radio apparatus with free space at a different direction with respect to said antenna array, said means including a plurality of hybrid junctions coupling each of said antenna elements to each of said units of radio apparatus.

7. A combination as defined in claim 6 wherein each of the circuits for coupling said antenna elements to said units of radio apparatus also includes a circulator directly connected to each of said antenna elements.

8. A combination as defined in claim 6 wherein pairs of said antenna elements are coupled to opposite terminals of said hybrid junctions, and the conjugate terminals of each of said hybrid junctions are connected to said units of radio apparatus and to other hybrid junctions.

9. In combination, four antenna elements, a circulator coupled to each of said antenna elements, a first radio apparatus, a first circuit means connected to all of said circulators for coupling energy from each of said antenna elements to said first radio apparatus with uniform phase delay, a second radio apparatus, a second coupling circuit means associated with said second radio apparatus, and means for transmitting the energy not abstracted by said first coupling circuit to said second coupling circuit, the net phase delay in the circuits interconnecting each of said antenna elements and said second radio apparatus progressively increasing in accordance with the physical position of said antenna elements.

10. In combination, four antenna elements, a first radio apparatus, a first circuit means for coupling energy from each of said antenna elements to said first radio apparatus with uniform phase delay, a second radio apparatus, a second coupling circuit means associated with said second radio apparatus, and means for transmitting the energy not abstracted by said first coupling circuit to said second coupling circuit, the net phase delay in the circuits interconnecting each of said antenna elements and said second radio apparatus progressively increasing in accordance with the physical position of said antenna elements.

11. In combination, a plurality of antenna elements, a circulator coupled to each of said antenna elements, a first radio apparatus, a first circuit means connected to all of said circulators for coupling energy from each of said antenna elements to said first radio apparatus with preassigned phase delays, a second radio apparatus, a second coupling circuit means associated with said second radio apparatus, and means for transmitting the energy not abstracted by said first coupling circuit to said second coupling circuit, the net phase delay in the circuits interconnecting each of said antenna elements and said second radio apparatus being different from said preassigned phase delays and progressively increasing in accordance with the physical position of said antenna elements.

12. In combination, at least three antenna elements, a first radio apparatus, a first circuit means for coupling energy from each of said antenna elements to said first radio apparatus with preassigned phase delays, a second radio apparatus, a second coupling circuit means associated with said second radio apparatus, and means for transmitting the energy not abstracted by said first coupling circuit to said second coupling circuit, the net phase delay in the circuits interconnecting each of said antenna elements and said second radio apparatus being different from said preassigned phase delays and progressively increasing in accordance with the physical position of said antenna elements.

References Cited in the file of this patent

UNITED STATES PATENTS

| | | |
|---|---|---|
| 2,748,352 | Miller | May 29, 1956 |
| 2,748,353 | Hogan | May 29, 1956 |